United States Patent [19]
Naramura

[11] Patent Number: 5,365,835
[45] Date of Patent: Nov. 22, 1994

[54] HAMBURGER FIXING APPARATUS

[75] Inventor: Michiyuki Naramura, Okayama, Japan

[73] Assignee: Kabushiki Kaisha Kyowa Kogyosho, Kurashiki, Japan

[21] Appl. No.: 170,430

[22] Filed: Dec. 20, 1993

[30] Foreign Application Priority Data

Apr. 6, 1993 [JP] Japan ................... 5-079644

[51] Int. Cl.$^5$ ............ A21D 13/08; A23L 1/31; B65B 25/16; G07F 11/70
[52] U.S. Cl. ................. 99/450.5; 99/325; 99/357; 99/443 C; 99/450.4; 364/400; 364/478; 395/82
[58] Field of Search ............... 99/450.1, 450.2, 450.4, 99/450.5, 325, 326, 334, 352, 355, 357, 443 R, 443 C, 494; 426/274, 275; 364/477, 478, 400; 395/82; 221/150 A, 150 R, 124, 151; 219/388

[56] References Cited

U.S. PATENT DOCUMENTS

| | | | |
|---|---|---|---|
| 3,183,856 | 5/1965 | Jolly | 99/450.4 |
| 3,364,878 | 1/1968 | Kobori et al. | 99/450.4 |
| 3,783,772 | 1/1974 | Fay | 99/450.7 |
| 3,859,904 | 1/1975 | Carriazo | 99/450.4 |
| 4,202,260 | 5/1980 | Weger | 99/450.4 |
| 4,513,656 | 4/1985 | Fay | 99/450.7 |
| 4,944,218 | 7/1990 | Cresson | 99/357 |
| 5,101,716 | 4/1992 | Cones, Sr. et al. | 99/450.5 |
| 5,113,754 | 5/1992 | Robinson et al. | 99/326 |
| 5,132,914 | 7/1992 | Cahlander et al. | 364/478 |
| 5,172,328 | 12/1992 | Cahlander et al. | 364/400 |

FOREIGN PATENT DOCUMENTS

2641162 7/1990 France ................... 99/450.4

Primary Examiner—Timothy F. Simone
Attorney, Agent, or Firm—Thomas R. Morrison; Peter J. Gluck

[57] ABSTRACT

A hamburger fixing apparatus has a food material feeding line conveyor. Various kinds of sandwiches or hamburgers, as indicated on an order display board, are prepared by an automatic feeding mechanism controlled by a computer and an operator in a manner such that each of the food materials necessary for the ordered items is added one on another while being conveyed on the food material feeding line conveyor. The food material feeding line conveyor has a first automatic fixing section in its upstream starting end region, a second automatic fixing section in its downstream finishing end region and a manual fixing section between the two regions. The apparatus further has a stopping mechanism to accumulate an intermediate ordered item. The apparatus also has an initial input system for sending out information which causes a command to be output from the computer to each of the automatic feeding mechanisms of the first automatic fixing section and a second input system for sending out information for generating a command output from the computer to each automatic feeding mechanism of the second automatic fixing section and for releasing the stopping mechanism.

5 Claims, 9 Drawing Sheets

HAMBURGER FIXING APPARATUS

BACKGROUND OF THE INVENTION

This invention relates to hamburger fixing apparatus. More particularly, the invention relates to a hamburger fixing apparatus which has the ability to prepare different types of hamburgers and sandwiches using a reduced number of elements, thereby increasing productivity.

Recently, in addition to conventional hamburgers having: a patty, ketchup and other items placed between a top portion (a crown) and a bottom portion (a heel) of a bun, a variety of other types of hamburgers and sandwiches have been available at hamburger shops. These, include, for example, teriyaki burgers (adding teriyaki sauce to conventional hamburger patties), bacon and lettuce burgers (adding bacon and lettuce to conventional hamburgers), cheeseburgers, and various types of fry sandwiches (such as fish fry sandwiches, croquette sandwiches and fried chicken sandwiches). The words "a hamburger or hamburgers" and "a sandwich or sandwiches" hereinafter imply any one or all of the above interchangeably unless otherwise specified.

As the number of consumers increase and the kinds and types of hamburgers and sandwiches become more diversified, a demand has arisen for heightened productivity of hamburgers and sandwiches.

Conventional kitchen facilities include a freezer for patties, a broiler for broiling or grilling patties, a toaster for buns, a frier for croquettes or other fried foods and a table for adding lettuce, cheese, pickles, sauce, and other seasonings on hamburger buns or patties. Each section independently processes the hamburgers. All of the processes are manually performed. The first problem is that the productivity of the conventional kitchen facilities has been improved upon many times and have now reached an ultimate limit.

In order to solve the problem mentioned above, automatic hamburger fixing apparatus have been developed. For example, the apparatus disclosed in the Japanese Patent Application Laid Open No. 1-91739 may be employed.

The above automatic fixing apparatus is, however, designed to fix only limited kinds of sandwiches and hamburgers. In order to prepare all of the kinds of sandwiches and hamburgers listed above, an apparatus must have feeding and adding mechanisms for each and every type of food material necessary for producing the hamburgers or sandwiches. This requires a large space in which to install the apparatus. In addition, every time a new type of sandwich or hamburger is added, another mechanism for feeding the new food material has to be incorporated in the existing apparatus. Additionally, the control system of the apparatus must be modified accordingly. It is impossible to install such an apparatus in a conventional, relatively small kitchen, and it is difficult to install additional mechanisms and modify the control system for feeding the new food material. This is the second problem.

OBJECTS AND SUMMARY OF THE INVENTION

Accordingly, it is an object of this invention to provide a hamburger fixing apparatus which eliminates the drawbacks of the prior art.

It is still another object of this invention to provide a hamburger fixing apparatus capable of preparing a variety of sandwiches and hamburgers, which can be installed in rather small kitchens, and can thereby enhance productivity and efficiency of these kitchens.

Briefly stated, the present invention provides a hamburger fixing apparatus with a food material feeding line conveyor. Various kinds of sandwiches or hamburgers, as indicated on an order display board, are prepared by an automatic feeding mechanism controlled by a computer and an operator in a manner such that each of the food materials necessary for the ordered items is added one on another while being conveyed on the food material feeding line conveyor. The food material feeding line conveyor has a first automatic fixing section in its upstream starting end region, a second automatic fixing section in its downstream finishing end region and a manual fixing section between the two regions. The apparatus further has a stopping mechanism to accumulate an intermediate ordered item. The apparatus also has an initial input system for sending out information which causes a command to be output from the computer to each of the automatic feeding mechanisms of the first automatic fixing section and a second input system for sending out information for generating a command output from the computer to each automatic feeding mechanism of the second automatic fixing section and for releasing the stopping mechanism.

According to an embodiment of the present invention, a hamburger fixing apparatus, comprising: a food material conveyor having an upstream starting end region, and a downstream finishing end region, a first automatic fixing section located at said upstream starting end region, a second automatic fixing section located at said downstream finishing end region, a manual fixing section located between said upstream starting end region and said downstream finishing end region, a first input system, means for displaying a plurality of ordered items input into said first input system, means for controlling said first automatic fixing section and said second automatic fixing section, said means for controlling sends commands to a plurality of food adding means of said first automatic fixing section for making said plurality of ordered items based on an information command sent from said first input system, means for stopping many kinds of intermediate ordered items being carried by said food material conveyor from said first automatic fixing section to said manual fixing section, thereby causing said many kinds of intermediate ordered items to accumulate in said manual fixing section, a second input system, said second input system sending an information command based on an operator input to said means for controlling, said means for controlling sending a command to a plurality of food adding means of said second automatic fixing section, wherein said command instructs said plurality of food adding means to add at least one food material according to an information command sent from said second input system, and said second input system sending a release command to said means for stopping so that said plurality of intermediate ordered items which have been through said manual fixing section may be conveyed further to said second automatic fixing section.

According to still another embodiment of the present invention, a hamburger fixing apparatus, comprising: means for conveying food material from an upstream starting end region to a downstream finishing end region, a first automatic fixing section located at said upstream starting end region, a second automatic fixing section located at said downstream finishing end region, a manual fixing section located between said upstream starting end region and said downstream finishing end region, first means for inputting an order for an item, said first inputting means having a means for displaying a plurality of ordered items input into said first inputting means, means for controlling said first automatic fixing section and said second automatic fixing section, said means for controlling sending commands to a plurality of food adding means of said first automatic fixing section for making said plurality of ordered items based on an information command sent from said first means for inputting, second means for inputting an operator command, said operator command sent to said means for controlling, means for stopping and accumulating a plurality of intermediate ordered items being carried by said conveyor means from said first automatic fixing section to said manual fixing section, said second means for inputting sending a release command to said means for stopping and accumulating so that said plurality of intermediate ordered items which have been through said manual fixing section may be conveyed further to said second automatic fixing section, and said means for controlling sending a command to a plurality of food adding means of said second automatic fixing section, wherein said command instructs said plurality of food adding means to add at least one food material according to said operator command.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

A hamburger fixing apparatus according to the present invention includes a food material feeding line conveyor. Various kinds of sandwiches and/or hamburgers, as indicated on an order display board, are prepared by an automatic feeding mechanism controlled by a computer and an operated such that each of the food materials necessary for the ordered items is added one to another, as the food is conveyed on a food material feeding line conveyor. The food material feeding line conveyor comprises a first automatic fixing section in its upstream starting end region, a second automatic fixing section in its downstream finishing end region and a manual fixing section between the two regions.

The hamburger fixing apparatus includes an initial input system for displaying ordered items on the order display board. It sends out information for executing a command, which corresponds to the hamburger or sandwich order, to be output from the master CPU of the computer to each automatic feeding mechanism of the first automatic fixing section.

It further includes a mechanism for stopping the intermediate materials being conveyed from the first fixing section, causing them to accumulate in the manual fixing section.

Lastly, a second input system exists for inputting information by an operator for transmitting a command from the master CPU to each automatic feeding mechanism of the second automatic fixing section according to a queue of the intermediate articles which have been processed in the manually fixing section. The command corresponding to the order for making hamburgers. The system also releases the stopping mechanism so that the intermediate articles which have been through the manual fixing process may be conveyed to the second automatic fixing section.

The hamburger fixing apparatus has the order display board at a position visible by an operator working near the manually fixing section, and has the interface board of the second input system at a position where the operator can operate it from where he or she stands with respect to the manual fixing section.

Structurally, the automatic fixing mechanisms of the first automatic fixing section include, in order from the upstream starting end to the downstream finishing end of the section, an automatic toasted heel feeding machine, an automatic feeding machine for various liquid and kneaded seasonings, and an automatic grilled patty feeding machine. The automatic fixing mechanisms of the second automatic fixing section include, in order from the upstream starting end to the downstream finishing end of the section, an automatic grilled patty feeding machine, an automatic feeding machine of various liquid and kneaded seasonings, and an automatic toasted crown feeding machine. The operator in the manual fixing section may add hamburger food materials such as vegetables, cheese, various fries, and various liquid and kneaded seasonings.

On a top level basis, the hamburger fixing apparatus functions as outlined below:

(1) Jobs in the first automatic fixing section.

In the first automatic fixing section of the food material adding line conveyor, at the upstream starting end, the heel portion of the bun is fed out and put on the conveyer. In succession, various liquid and/or kneaded seasonings and a patty are placed on the heel according to the order.

(2) Jobs in the manually fixing section.

In the manual fixing section, an operator adds on to the heel component prepared by the first automatic fixing section, at least: one of the following items (creating an intermediate hamburger): vegetables, cheese, various fried foods, and liquid and/or kneaded seasonings.

(3) Jobs in the second automatic fixing section.

In the second automatic fixing section, in accordance with the order, a patty and liquid and/or kneaded seasonings are added, and a crown portion of the bun is placed on the top thereof.

The hamburger fixing apparatus can make various kinds of hamburgers and sandwiches, some of which are described below with reference to the above numbered sections:

1. Teriyaki sandwich

At section (1), a heel is fed out and put on the conveyor, a seasoning (teriyaki sauce) is added and then a patty is placed on the heel. Next, at section (2), a seasoning (teriyaki sauce), and then a vegetable (lettuce) are put in order on the top of the heel component. Finally, at section (3), a seasoning (mayonnaise) and a crown are respectively fed out and added in that order on the top of the heel section.

2. Fry sandwich

At section (1), a heel is fed out and put on the conveyor. Next, at section (2), a fry and other food stuffs, if necessary, are put on the heel. Finally, at section (3), some seasonings (sauce, tartar sauce) and a crown are respectively fed out and placed in that order on the top of the heel component.

3. Conventional regular hamburger

At section (1), a heel is placed on the conveyor, and then a patty is fed out and put on the heel. Next, at section (2), a vegetable (onion), and pickles are put in that order on the patty. Finally, at section (3), seasonings (burger sauce, mustard) and a crown are respectively fed out and put in that order on the top of the heel component.

4. Cheeseburger

At section (1), a heel is placed on the conveyor, and a patty is fed and put on the heel. Next, at section (2), a vegetable (onion), a pickle and cheese are put in that order on the patty. Finally, at section (3), some seasonings (burger sauce, mustard) and a crown are respectively fed out and put in that order on the top of the heel component.

As described above, various kinds of hamburgers and sandwiches can be fixed in one line. As a result, the hamburger fixing apparatus can be small in size. Therefore, this apparatus can be installed in a conventional, rather small kitchen.

Productivity can be increased by adding mechanisms which stop the intermediate hamburgers at specific points, allowing the operator to perform other jobs. Usually, it takes at least about 30 seconds to toast a heel of a bun or grill a patty. It takes this amount of time for one toasted heel to be put at the upstream starting end of the first automatic fixing section. Therefore, the manual fixing section receives the intermediate hamburgers at a rate of one every 30 seconds or more from the first automatic fixing section.

However, the manual fixing section work may be done within 10 seconds, resulting in an idle time (the time when an operator is free from his or her fixing job) for at least 20 seconds.

The hamburger fixing apparatus of the present invention has a stopping mechanism stopping and accumulating a group of intermediate hamburgers and sandwiches at a certain position. This accumulates the idle times with respective to the intermediate hamburgers and sandwiches (the number of intermediate hamburgers and/or sandwiches×20 seconds). During this accumulated time, the operator may do other jobs., such as frying food materials.

A problem arises when one of accumulated intermediate hamburgers and/or sandwiches is to become a fry sandwich. This type of intermediate hamburger/sandwich has to wait until a fry is ready. If the other intermediate hamburgers following it have been through the process in that section, the intermediate fry sandwich generally ends up preventing the other intermediate hamburgers/sandwiches from moving forward to the second automatic fixing section. The apparatus of the present invention, solves this problem by setting aside the intermediate fry sandwich from the conveyer line. The fry sandwich is just an example, and it may be, of course, applied to any of the hamburgers and/or sandwiches.

The operator works according to the display (which is visible from the operator's working position) on the order display board in the manual fixing section. In the case mentioned above, the operator may put information into the second input system regarding the intermediate hamburgers which have been through the process in the first section, without leaving his working position.

In accordance with this input information, the stopping mechanism is released, and the intermediate hamburgers which have been through the manual process flow toward the second automatic fixing section. In the second fixing section each of the intermediate hamburgers/sandwiches is completed automatically according to the corresponding order. The intermediate fry sandwich left aside may be put in the next batch. Therefore, the hamburger fixing apparatus allows the operator to do other jobs during the accumulated idle time, resulting in increased productivity.

A more detailed description of some the embodiments of the present invention are presented below with reference to the accompanying drawings.

Generally, a hamburger fixing apparatus of the present invention includes a patty grilling system, a bun toasting system, a assembling system, and a wrapping system. Each system is described sequentially below.

Figure 3:
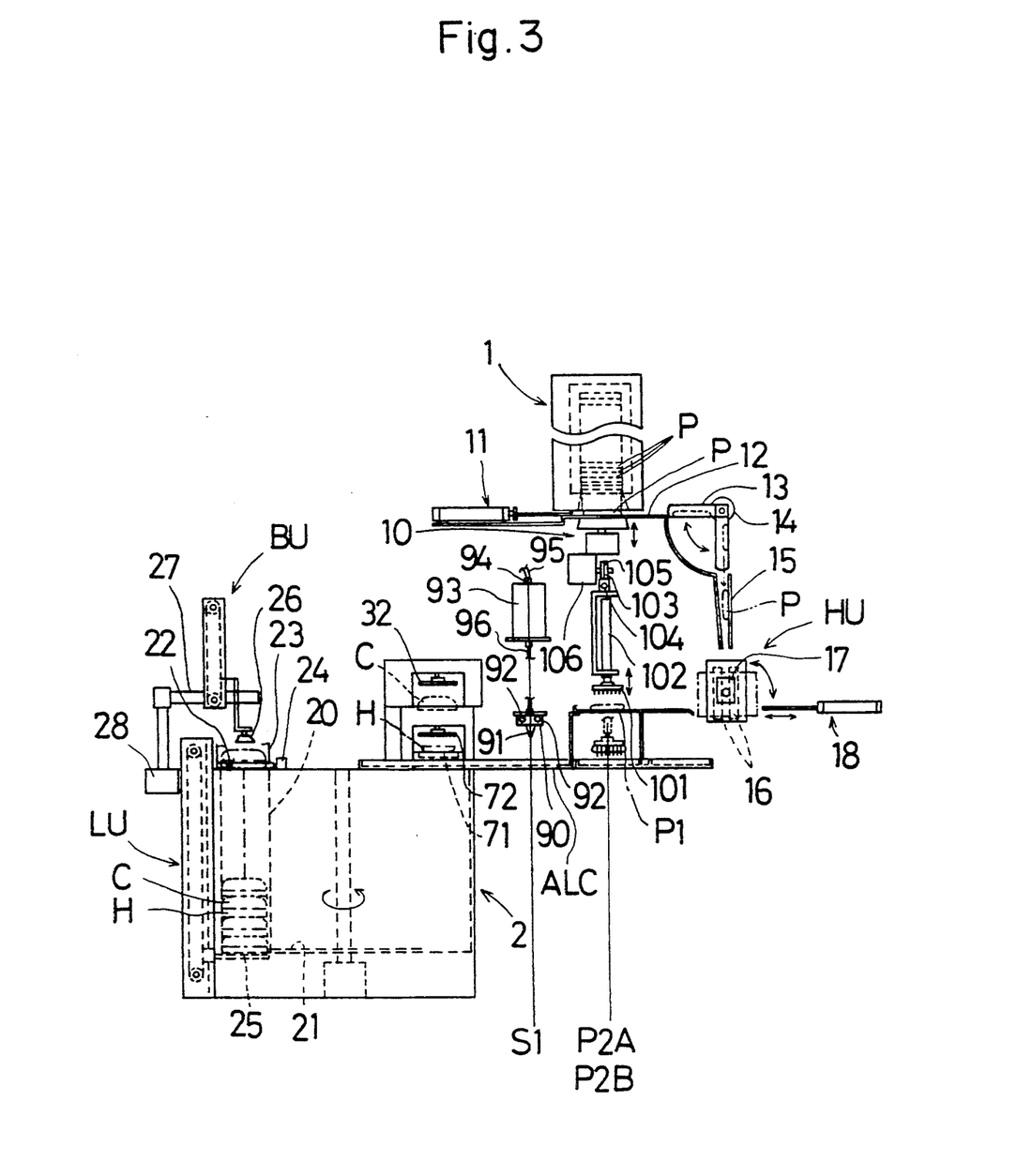
FIG. 3 is a side view of the hamburger fixing apparatus shown in FIG. 1.

Referring to FIG. 3, frozen patties are piled up and stored in a patty freezer 1. The frozen patty pile is supported by an elevating unit 10. In response to a command from an order, elevating unit 10 lowers down to a position where a bottom patty P of the patty pile can be pushed out from the patty freezer 1 on to the elevating unit 10.

Bottom patty P is pushed laterally by a pusher 11 to slide on a guide 12 into a frozen patty position changing box 13. Position changing box 13 is rotated through 90 degrees by a rotary actuator 14, allowing the patty P in the position change box 13 to fall into a heating unit (HU) through vertical guide 15. Rotary actuator 14 then returns to its previous position to receive another patty.

Heating unit (HU) has a stopper (not shown) which stops and receives the frozen patty P falling through vertical guide 15, It positions the patty P correctly in heating unit HU. In heating unit HU, patty P is pressed, heated and grilled between a pair of confronting ceramic heaters 16. When this process is over, heating unit HU is rotated through 90 degrees by a second rotary actuator 17 into a patty push-out position.

Figure 1:
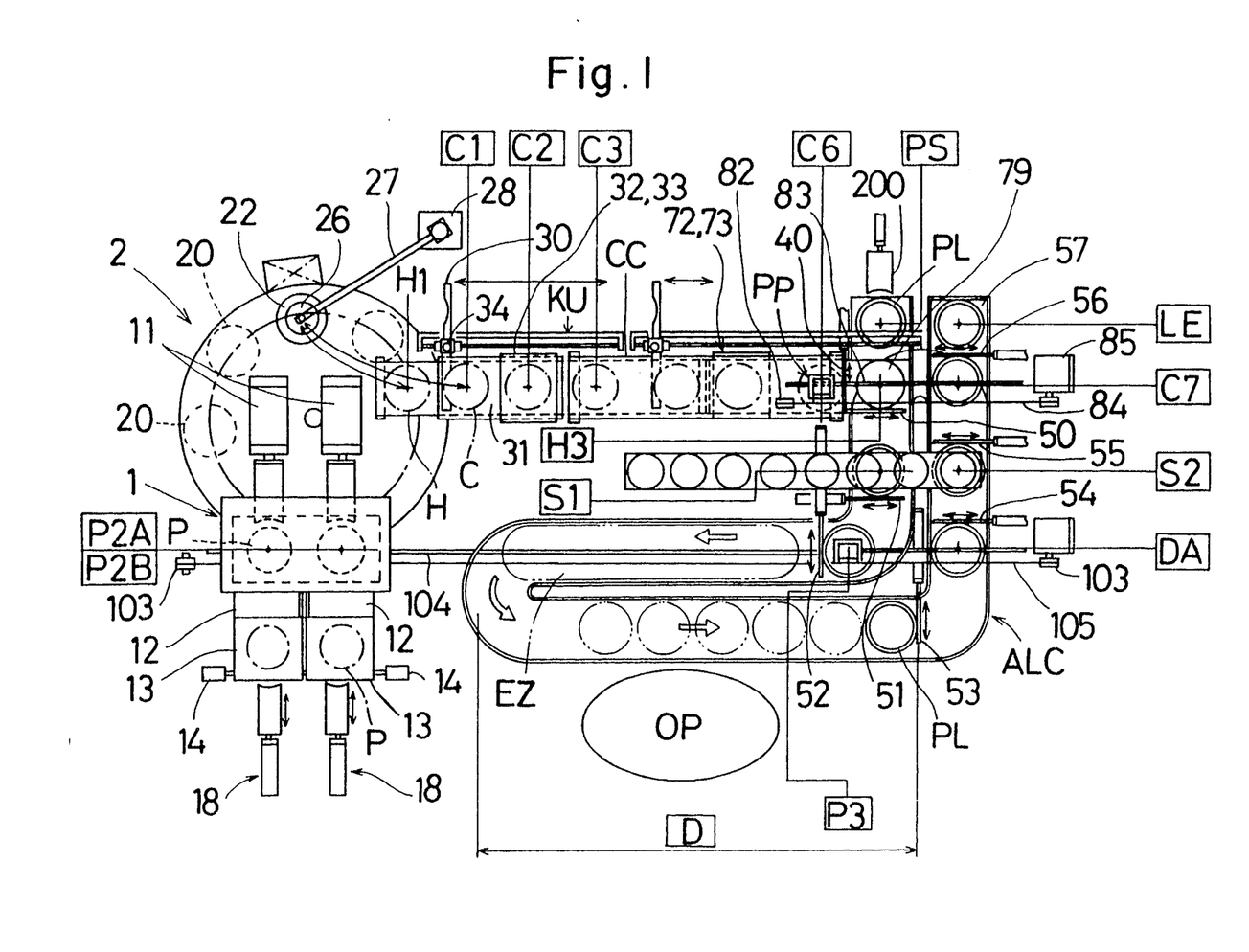
FIG. 1 is a plan view of an embodiment of the hamburger fixing apparatus according to the present invention.

Referring to FIGS. 1 and 3, at the patty push-out position the stopper in heating unit HU is released, and the patty, which has been heated and grilled, is pushed out by a second pusher 18 to a pick-up position P2A. In this embodiment, there are two lines conveying the patties. The other patty is pushed out to position P2B.

Figure 2:
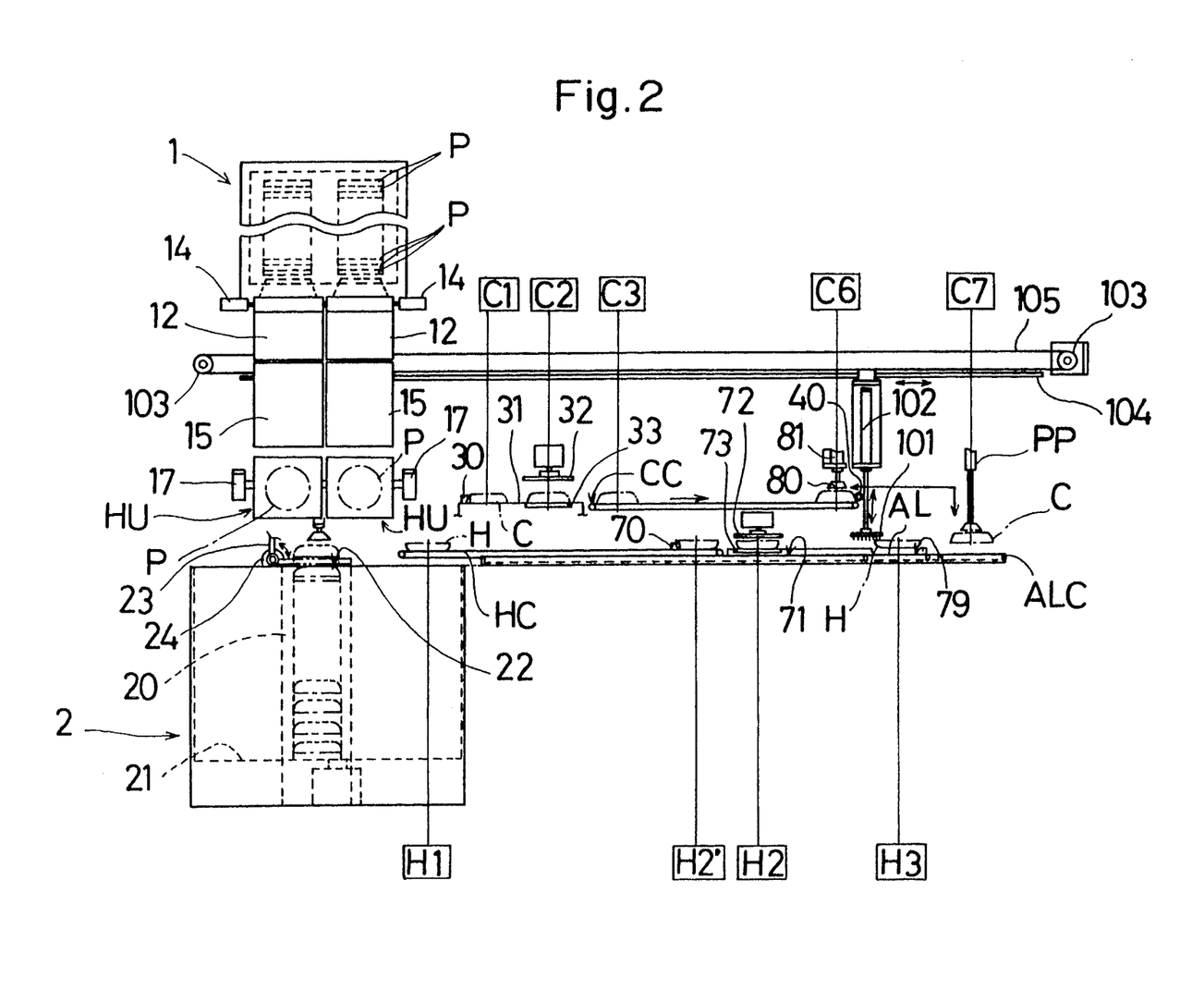
FIG. 2 is a front view of the hamburger fixing apparatus shown in FIG. 1.

Referring to FIGS. 2 and 3, buns are stored in a bun magazine 20. Each bun has a heel H and a crown C. Bun magazines 20 (eight in this embodiment) are outfitted on a bun magazine rotary unit 21 in a bun stocker 2. A top plate of the bun stocker has an outlet 22 through which a bun is picked up. The rotation pitch of the rotary unit 21 is controlled so that one of the bun magazines 20 in the bun stocker 2 is positioned to align with the outlet 22.

By a command according to an order, a cover plate 23 is rotated through 90 degrees by a third rotary actuator 24, and outlet 22 is opened. Referring to FIG. 2, a state where outlet 22 is closed is shown by double dotted chain lines and another state where outlet 22 is open is shown by solid lines. Outlet 22 is usually closed with cover plate 23 so as to not hinder the humidity control within the bun stocker 2.

Referring to FIG. 3, a lift-up unit LU elevates its lifting arm 25 up to a position where a top bun (a crown C and heel H) in bun magazine 20 comes out of bun stocker 2. Lift-up unit LU is controlled by a sensor (not shown) and stops elevating lifting arm 25 when the sensor detects that a bun (crown C and heel H) is raised up to a specified position where the bun is well enough out of the bun stocker 2. When one of the bun magazines 20 immediately under outlet 22 is empty, bun magazine rotary unit 21 rotates by one unit so that a next bun magazine 20 is positioned in the specified position just under outlet 22.

Referring back to FIGS. 1 and 2, a vacuum head 26 is then lowered down to a pickup position by a vacuum elevating unit BU, and picks up crown C. Swivel arm 27 holding vacuum head 26 is rotated by a fourth rotary actuator 28 through a specified angle, thereby placing crown C at a specified position C1. Afterwards, vacuum head 26 returns to the original place (right above outlet 22) and then picks up and places heel H in the same manner, thereby placing a heel H in a set position H1.

Crown C, which was picked up from bun stocker 2 and placed at position C1, is sent by a shift arm 30 to a crown toasting position C2 by sliding on a toasting base 31. The movement of shift arm 30 from position C1 to position C2 is carried out by a driving unit KU. The programming of the operation sequence of driving unit KU also includes the movement of shift arm 30 from position C2 to position C3, so that a crown which has been toasted at position C2 by upper and lower crown toasting heaters 32 and 33 is transferred to the position C3. When shift arm 30 returns to position C1 from position C3, in order for the shift arm 30 not to interfere with a next crown C being placed at position C1, before starting to return, shift arm 30 is rotated by a fifth rotary actuator 34 by 180 degrees to a position sufficient to avoid interfering with the next crown at position C1.

Toasted crown C is next conveyed to a position C6 by a crown conveyor CC. Position C6 is where crown C waits to be picked up and put in a assembly line. At this stage, crown C is positioned in place by a stopper 40. If there is another crown C occupying position C6, crown C being conveyed toward position C6 stops in contact with other crown C. If plural crowns follow them, they are stopped in line and sequentially accumulated on crown conveyor CC (such a state is referred to as an accumulated state). In this embodiment, accumulating capacity is four crowns at a time.

On the other hand, heel H is moved forward to a position H2' by a heel conveyor HC and is further sent to a position H3 by a driving unit (not shown). A heel shift arm 70 operates in the same manner as the driving unit KU and shift arm 30 for crowns C, described above. Position H3 is where a heel H waits to be transferred onto the assembly line.

Although crowns C are picked up and placed on the assembly line as mentioned above, heels H are transferred onto the assembly line in a different manner.

Figure 5:
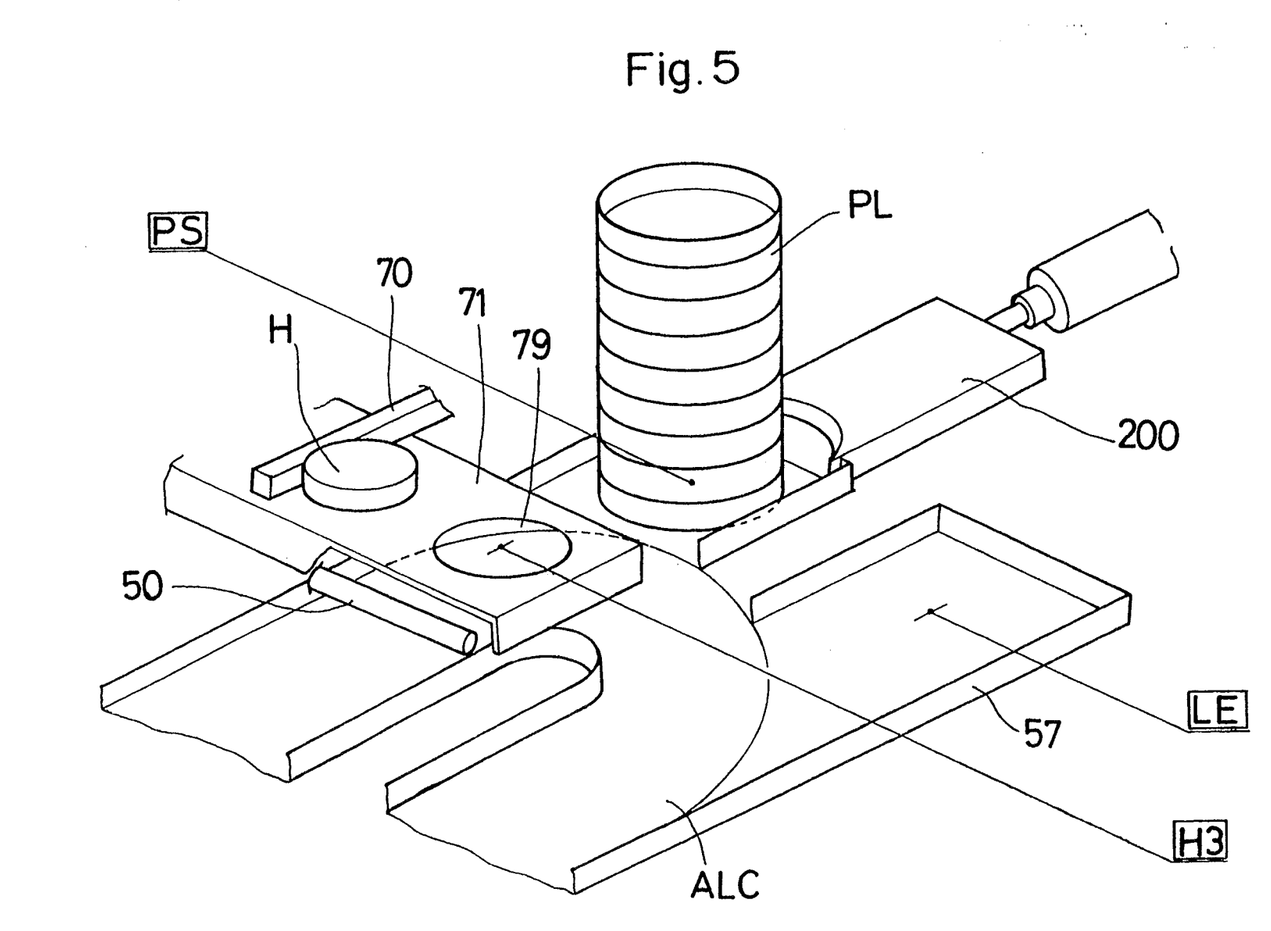
FIG. 5 is a perspective view near a starting upstream end of an assembly line conveyor of the hamburger fixing apparatus shown in FIG. 1.

Referring to FIGS. 1 and 5, a heel shift table 71 has a heel drop hole 79 at a place corresponding to position H3. When heel H reaches position H3, it falls down through drop hole 79 onto a pallet PL which is positioned immediately below the hole 79 on an assembly line conveyor ALC.

Heel H is toasted between upper and lower heel toasting heaters 72 and 73 at the position H2 in the same as crowns C. Different from crowns C, toasted heels H are transferred and put on the assembly line conveyor ALC without being accumulated.

Assembling of hamburgers and/or sandwiches is completed as pallet PL is transferred by assembly conveyor line ALC from the position just under the position H3, where it receives a heel H, to a position C7, where a crown C is placed on the top. While pallet PL is conveyed, necessary food materials are added one on top of another at respective positions, as described below.

An arbitrary number of pallets PL are placed on assembly line conveyor ALC, and conveyer ALC is continuously driven at a constant speed on one plane in a substantially L-formed track.

When heel H is toasted by upper and lower heel toasting heaters 72 and 73, transferred and set in a pallet PL at position H3, a positioning stopper 50 is released, and pallet PL is moved toward a next position S1 by conveyor ALC. When a sensor (not shown) detects approach of pallet PL to position S1, a pallet stopper 51 is actuated and positions pallet PL at position S1.

Figure 4:
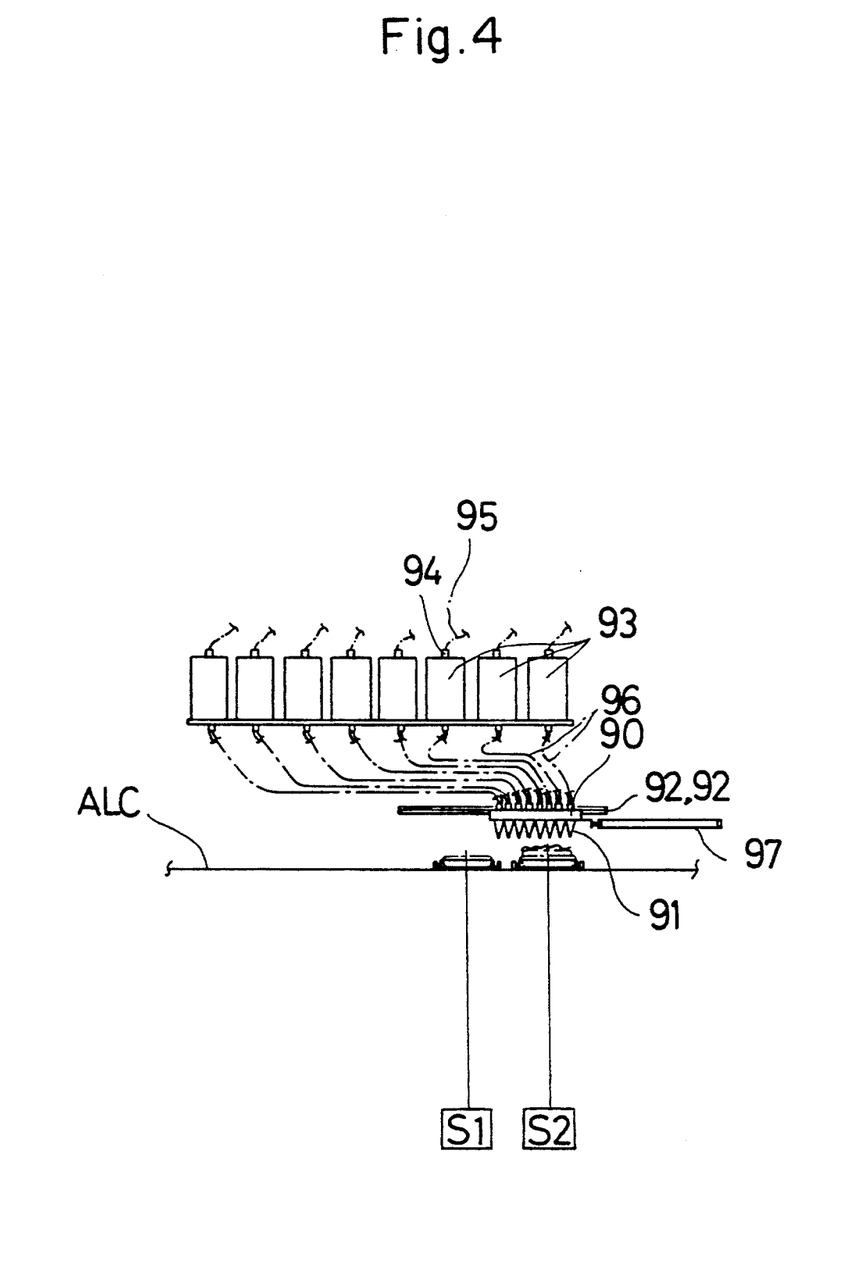
FIG. 4 is a diagram of an embodiment of the machines for feeding liquid and/or kneaded seasonings of the hamburger fixing apparatus according to the present invention.

Referring to FIG. 4, when pallet PL is positioned at position S1, according to an order, a manifold 90 comprising discharge nozzles 91 of liquid and kneaded seasonings is slid along shift guide 92 by a shift actuator 97 to a position where necessary discharge nozzle or nozzles 91 come to the center of pallet PL. Liquid and kneaded seasonings include burger sauce, teriyaki sauce, mayonnaise, tartar sauce, ketchup, mustard and other such items. When the necessary discharge nozzle or nozzles 91 are in place, compressed air is injected into a liquid or kneaded seasoning tank 93 through a connector 94 and an air tube 95 connected therewith. Consequently, the compressed air pushes out necessary liquid or kneaded seasonings contained in tank 93 through a discharge tube 96 and then discharge nozzle 91. In this way, the seasoning is added on the heel H placed in the pallet PL.

Discharge nozzle 91 is designed to be opened and closed by pressure. Injecting compressed air into liquid or kneaded seasoning tank 93 causes discharge nozzle 91 to be opened. This injection is stopped after a specific time. When injected air has been released, discharge nozzle 91 is closed. At the same time, the process of adding seasonings to heel H is completed. In this embodiment, therefore, the amount of seasoning to be discharged from nozzle 91 may be varied by controlling air injecting pressure and air injecting time into liquid or kneaded seasoning tank 93. Appropriate pressures and times may be set freely depending on the kinds of seasonings being used.

Referring to FIG. 4, after the necessary seasonings are added on heel H, pallet stopper 51 is released, and pallet PL moves toward a next position P3 on conveyor ALC. When a sensor detects approach of pallet PL to a position P3, P3 stopper 52 is actuated to stop and position the pallet PL at position P3.

Some sandwiches need no seasoning at position S1. In this case, a CPU does not allow a positioning mechanism to operate at position S1, and pallet PL just passes through this position and flows toward next position P3.

When pallet PL is positioned at position P3, a grilled patty which has been waiting at position P2A or P2B is put on a heel H which has been through the process of adding seasoning. Referring to FIGS. 2 and 3, the grilled patty is put on heel H. This is done by a picking and placing mechanism (which has a lifting cylinder 102, a sprocket 103, a guide rail 104, a rotating wire 105, a driving motor 106) having a sting head at its tip, which places the grilled patty on the heel H (i.e. the intermediate hamburger with some food stuff but no crown) located on pallet PL, which in turn, is positioned at P3.

Some sandwiches need no patty at position P3. In this case, the CPU does not allow the positioning mechanism to operate at this position and pallet PL just passes through this position and moves toward a next zone D.

Referring back to FIG. 1, when a patty is added, P3 stopper 52 is released, and pallet PL moves toward and into the next zone D by conveyor ALC. Positioning in zone D is different from positioning at the other places, and a stopper is not automatically controlled in collaboration with a sensor. At the downstream end of zone D, a zone D stopper 53 is usually set and stops each of pallets. In zone D, a plurality (for example, four to six) of pallets PL may be accumulated. Zone D stopper 53 may be released only when an operator OP inputs a release command.

Heels H which have reached zone D are added with main food materials and/or side food materials according to the ordered items. Here main food materials include various fries (such as fish, chicken or croquette), and side food materials include lettuce, onion, cheese, pickles, sauce and the like. This process of adding food stuffs on heels H is carried out by an operator OP manually. Operator OP must check pallets PL which have reached there, judge what should be added, and put the right food stuffs on the heels H.

Figure 6:
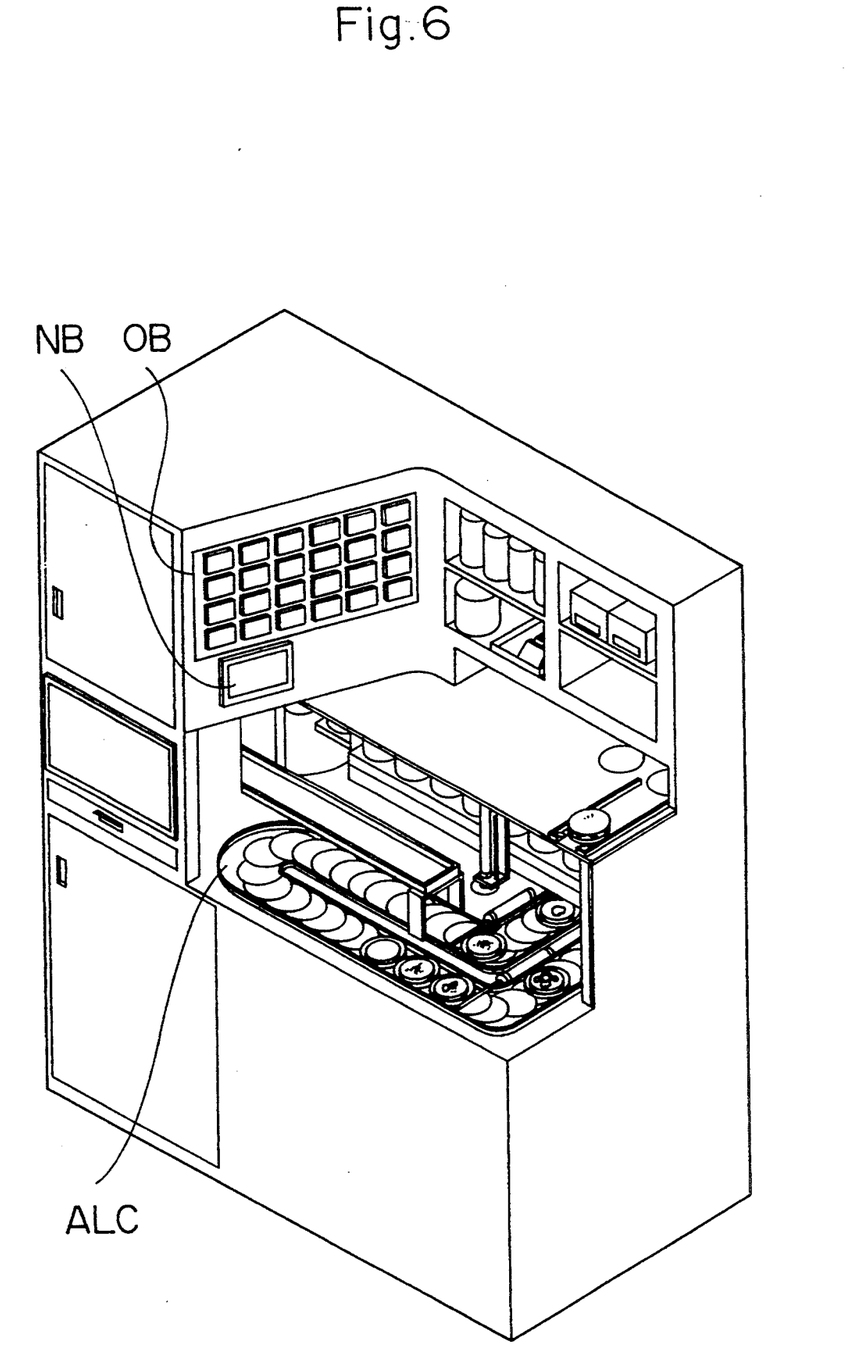
FIG. 6 is a perspective view of an embodiment of the hamburger fixing apparatus according to the present invention.
Figure 7:
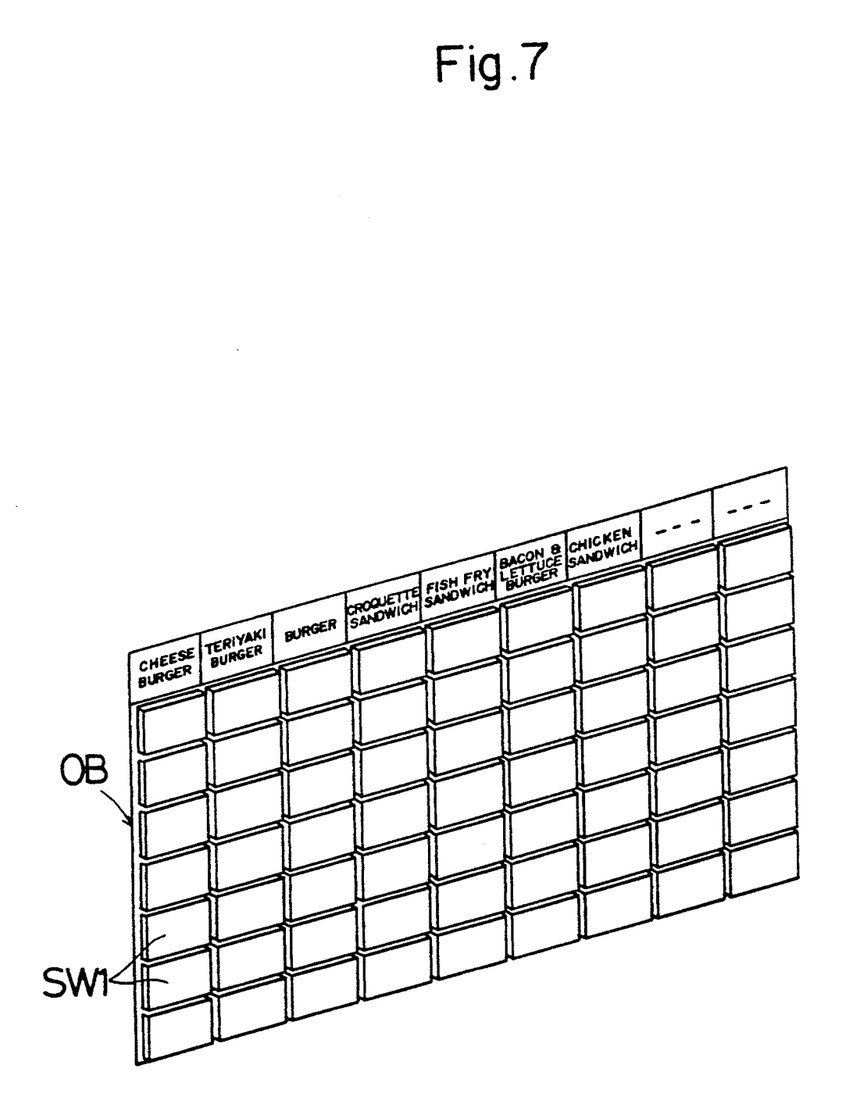
FIG. 7 is a diagram showing an order display board employed in an embodiment of the hamburger fixing apparatus shown in FIG. 1.
Figure 8:
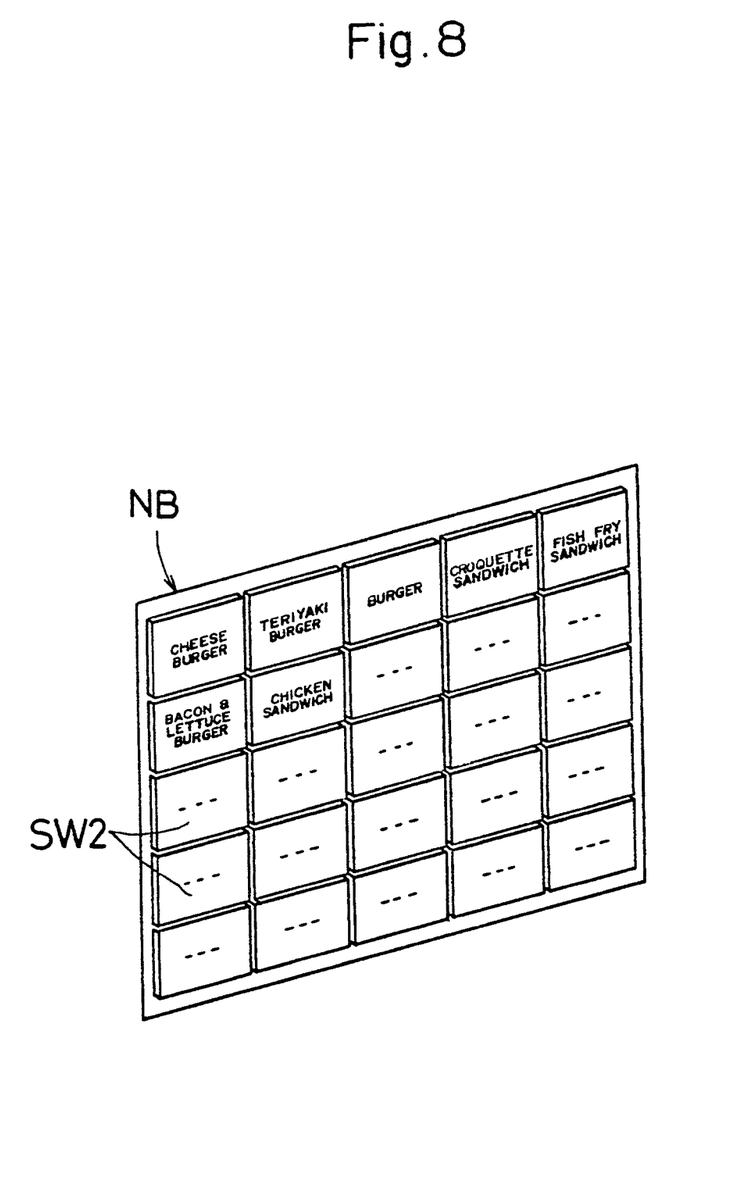
FIG. 8 is a second input board used in the hamburger fixing apparatus shown in FIG. 1.

Referring to FIG. 6, in order to ease operator OP functions, an order display board OB, which indicates the ordered items for heels H being conveyed on the line, is located at a position where the board is easily seen by operator OP. Referring to FIG. 7, order board OB is designed to indicate what kinds of hamburgers/sandwiches and how many of those kinds according to the customers' orders, by lighting up corresponding lamps so that the operator may recognize an order content at a glance. Referring to FIG. 8, after adding a main food material and a side food material in zone D, operator OP next manipulates an interface board NB of a second input system installed at a certain position. Referring to FIGS. 6 and 8, interface board NB comprises a plurality of switches SW2 to indicate all kinds of hamburgers/sandwiches.

When operator OP finishes adding food materials such as vegetables and fries necessary for respective kinds of hamburgers/sandwiches, operator OP pushes switches SW2 corresponding to the kinds of hamburger/sandwiches he/she has finished. This causes zone D stopper 53 to be released so that pallets PL which have been through the process, move toward "dummy" position DA. Simultaneously, corresponding lamps on the order board OB go out. A sensor counts the number of sandwiches passing through the position where zone D stopper 53 is being released, and when it detects that all of the ordered sandwiches input in the interface board NB have passed, zone D stopper 53 automatically returns on assembly line conveyor ALC.

Pallet PL stops at dummy position DA according to the cooperation of a sensor and a DA stopper 54 in the same manner as at the positions S1 and P3.

Dummy position DA is necessary for those kinds of sandwiches which need a patty after the addition of a side food material in zone D. In case of sandwiches which need no patty at this position, pallet PL just passes through this position. At a next position S2, pallet PL stops according to cooperation of a sensor and a S2 stopper 55 in the same manner as at the previous position.

At position S2, liquid or kneaded seasonings, if necessary, are added on the main and the side food materials, which were added in zone D. Liquid or kneaded seasonings are added by a discharge system in the same way as at position S1.

Referring back to FIG. 1, when addition of seasonings is completed at position S2, a S2 stopper 55 is released, so that pallet PL starts to move toward a next position C7. Pallet PL is positioned at position C7 by cooperation of a sensor and a C7 stopper 56.

When pallet PL is positioned at position C7, crown C which has been toasted by the crown toasting mechanism and is waiting at position C6, is picked up by a position C7 picking and placing mechanism (having a vacuum head 80 at its tip, an elevation cylinder 81, a sprocket 82, a guide rail 83, a rotating wire 84 and a driving motor 85). Crown C is then placed on heel H.

When the addition of crown C is completed at position C7, C7 stopper 56 shown is released so that pallet PL starts to move to a position LE along a discharge guide 57 by the rotating force of the conveyor.

Next, pallet PL is transferred from position LE to a wrapping position by a chute or other conveying means. The sandwich on pallet PL, which has been through all necessary processes is manually removed therefrom and wrapped. After this, empty pallet PL is transferred to a pallet feed position, where it waits to be sent out again to assembly line ALC.

A wrapping system, for example, includes an upper suction device and a lower suction device. In the wrapping system, an upper side of a wrapping bag is pulled upward by the upper suction device and a lower side thereof is drawn downward by the lower suction device so that the wrapping bag is open on one side and a fixed hamburger can be pushed into the bag through the open side thereof. This system is located near position LE.

The above description of the flow system assumes that only one pallet PL is flowing on assembly line conveyor ALC. In this case, in order to move pallet PL toward the next positions, the CPU detects a signal corresponding to the command that "process in a certain position has been finished," and this causes positioning stoppers to be released, so that pallet PL is conveyed toward the next position.

However, a plurality of pallets PL are generally conveyed on assembly line conveyor ALC continuously. In this case, the system operates in accordance with the following conditions:

(1) There are an arbitrary number of pallets PL waiting for process of food material addition and/or in the process at arbitrary positions on assembly line conveyor ALC.

(2) Times taken at each process differ for each product.

Under these conditions, a system for releasing a stopper in response to a signal that "process in a certain position has been finished" does not allow pallet PL to flow smoothly to a next position. For example, assuming that another pallet is under process at the next position, it may be sometimes desired not to advance the former pallet to the next position. Therefore, in the case of multiple continuous flows (i.e. when a plurality of pallets are being conveyed continuously), a system for transferring pallets should be built up incorporating a confirmation signal of "empty" at each next position, in addition to the signal of "completion" at present position. When both of the signals are established (an AND state), the system will then release the corresponding stoppers.

Empty pallets are fed again onto assembly line conveyor ALC as follows. Referring to FIG. 5, empty pallets are stacked at a position PS. A signal of "there is no pallet PL at the next position (i.e. position H3)" causes a pusher 200 to push out one pallet located at the bottom of the stack to a position H3 on conveyor ALC.

In this way, each pallet PL on conveyer ALC is continuously conveyed further to the next position along conveyer ALC by confirming the two signals, that is, the 'completion of process" signal at the position where each pallet stands and the "empty" signal at the position to which it moves next.

Buns (i.e. heels and crowns) are toasted in sequence in the bun toasting mechanism until the number of buns equals the number of buns required according to the orders. Heels H are transferred from the position onto position H3 and crowns C are moved from position C6 to position C7. At this time they are transferred one after another in the toasting mechanism according to a confirmation signal (or a signal indicating that a next position is not occupied) in the same way as in the conveyor line.

There is a time lag between a heel H that has completed all necessary food material addition processes and a crown C which is ready for assembling. After having been toasted, crowns C are temporarily detained until they are placed on heels H. The detaining area is from C1 to C6. Crowns C may be toasted at any position from C2 to C5. Crown C detaining area is equipped with a heat-retaining mechanism incorporating a heater in order to prevent crowns C from getting cold.

In the hamburger fixing apparatus of this embodiment, with an assembly system as described above, a variety of hamburgers and sandwiches may be fixed by using the apparatus, installation can be done in a conventional relatively small kitchen, and productivity is increased. Furthermore, increasing the productivity may save labor in the process.

Conventionally, three people are needed in a hamburger shop. That is, a "meat person" who is in charge of grilling patties and frying croquettes, fish fillets, chicken and the like, a "dress person" in charge of toasting buns and adding main food materials, side food materials and/or seasonings, and a "finishing person" who makes french fries, wraps the food and other various finishing preparations. In some instances, only two people are required to do all the jobs.

By using the present apparatus, a hamburger shop can reduce the amount of people needed to produce hamburgers and/or sandwiches. In this apparatus, zone D stopper 53 in zone D of assembly line conveyor ALC is designed to be released only when an operator OP puts a releasing command into interface board NB of the second input system. Therefore, while operator OP is away from zone D, pallets PL, which are waiting for the addition of food materials, accumulate successively at zone D stopper 53's position in zone D.

After six pallets PL have accumulated there, operator OP returns to zone D to start adding necessary food materials on heels H. When this manual process is completed, the operator OP presses corresponding switches SW2 on interface board NB installed near zone D, according to the kinds and the number of hamburgers and/or sandwiches on the pallets PL in zone D. This operation releases zone D stopper 53 and allows pallets PL which have been through the process in zone D to flow toward a next position. When the number of pallets which operator OP inputs has passed through there, zone D stopper 53 returns to be automatically reset.

Referring to FIG. 1, if the food materials for one or more of one batch (here, for example, six pieces) are not yet ready, the one or more together with their pallets PL may be manually taken to an escape zone EZ and the operator may manipulate the interface board NB accordingly.

As described above, operator OP is free to leave zone D after operator OP presses necessary switches SW2 of interface board NB, until another batch of pallets PL accumulates there. Operator OP may, at another place away from zone D, do other jobs such as making various fries including french fries and preparing for other jobs.

Namely, in the hamburger fixing apparatus of the present invention, patties are automatically grilled by the patty grilling system, buns are automatically toasted by the bun toasting system, various fries are made and other preparations are done by the "dress person", and wrapping is automated by the wrapping system, and therefore only one single operator OP (or "dress person") is needed for fixing a variety of hamburgers and/or sandwiches. In other words, the labor of two workers is saved.

Figure 9:
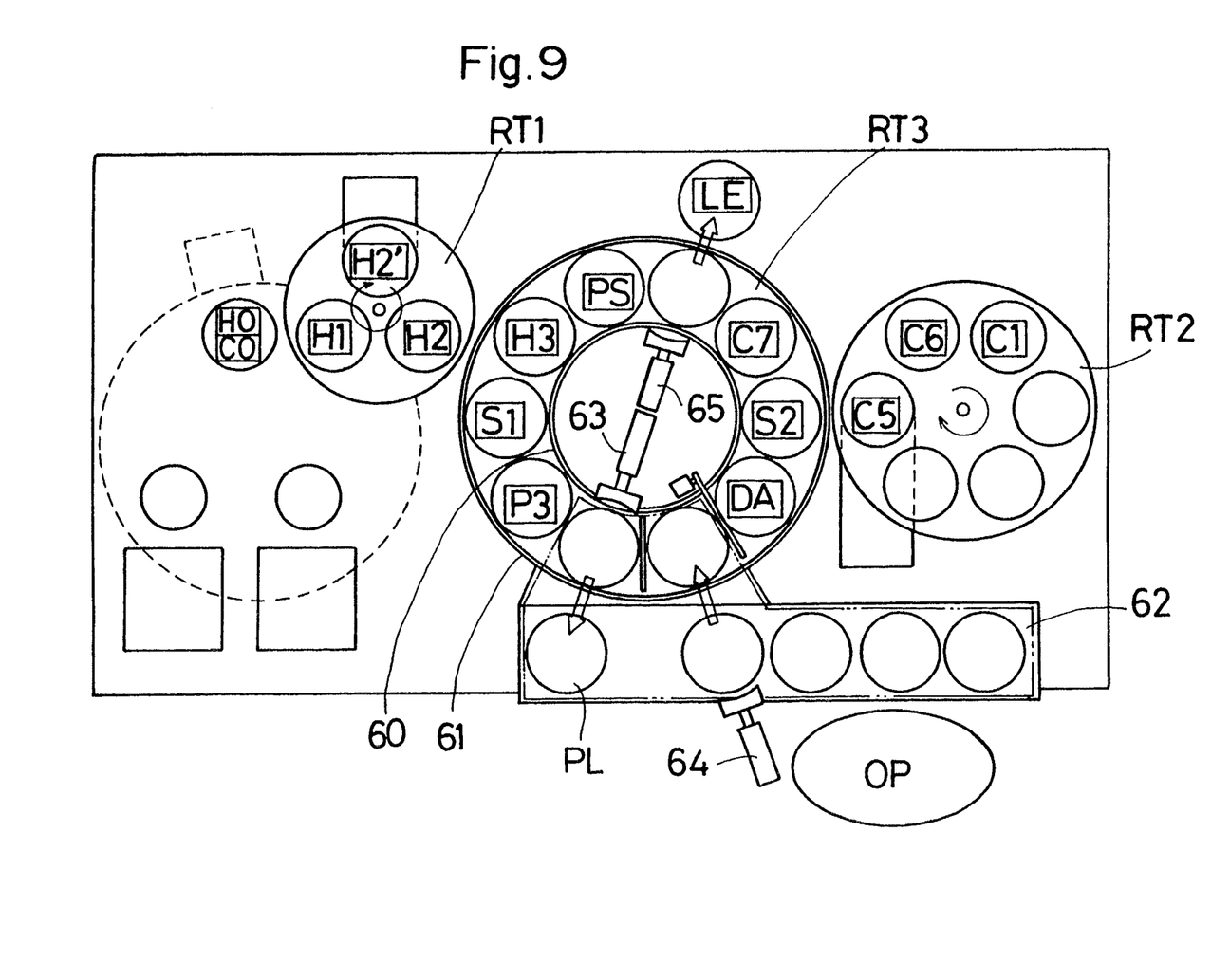
FIG. 9 is a diagram of another embodiment of the hamburger fixing apparatus according to the present invention.

Referring to FIG. 9, another embodiment of the hamburger fixing apparatus is illustrated. The patty grilling system is the same as described in the previous embodiment.

The bun toasting system in this embodiment differs from the one above, in that the mechanisms for transferring heels H from position H1 to position H2, conveying of crowns C from position C1 to position C6, feeding of heels H from position H2 onto pallets PL at position H3 and crowns C from position C6 onto pallets at position C7 are different.

First of all, the mechanism of transferring heels H from position H1 to position H2 is described. Heels H are picked up at position H0 and placed at position H1 by a pick and place unit having a vacuum head at the tip, as in the previous embodiment. The horizontal moving range of the pick and place unit covers from position H0 to H1, and crowns C are picked up at C0 and placed at C1 in the same manner.

A heel H placed at H1 is sent by a rotary table unit RT1 from H1 to H2' at which heel H is toasted. Heel H which has been toasted at H2' is sent by rotary table unit RT1 from H2' to H2 which is a position for waiting for addition of food stuff. In transferring heel H from H2 to H3 at which the heel is placed on the assembly line, it is picked up at H2 and placed at H3 by the same pick and place unit.

On the other hand, a crown C placed at C1 is sent by a rotary table unit RT2 from C1 to C5 where it is toasted and then to C6 which is a position for waiting. The crown at C6 is then picked up by the pick and place unit in the same way as heels, and placed at C7 which is a set position for crowns on the assembly line.

While the assembly system of the previous embodiment used a conveyer to convey pallets PL, a rotary table TR3 is employed in the second embodiment. In order to put pallets into line, an outer guide 61 and an inner guide 60 are fixed on rotary table RT3 so that pallets PL are transferred in line between them. Different from the first embodiment, a "dress" zone or an accumulating zone 62 is not within the flow of intermediate pieces on rotary table RT3, but is independent from rotary table RT3. Therefore, shifting pallets PL between rotary table RT3 and dress zone 62 and discharging pallets carrying completed hamburgers and/or sandwiches into position LE are conducted by shifting means such as pushers 63, 64 and 65.

Other mechanisms, for example, the stopper controls and the second input system used by operator OP are the same as in the first embodiment.

Being thus composed, the present invention is a hamburger fixing apparatus which is capable of fixing a variety of types of hamburgers and sandwiches, can be installed in a conventional relatively small kitchen, and results in increased productivity.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A hamburger fixing apparatus, comprising:
   a food material conveyor having an upstream starting end region, and a downstream finishing end region;
   a first automatic fixing section located at said upstream starting end region;
   a second automatic fixing section located at said downstream finishing end region;
   a manual fixing section located between said upstream starting end region and said downstream finishing end region,
   a first input system;
   means for displaying a plurality of ordered items input into said first input system;
   means for controlling said first automatic fixing section and said second automatic fixing section;
   said means for controlling sending commands to a plurality of food adding means of said first automatic fixing section for making said plurality of ordered items based on an information command sent from said first input system;
   means for stopping a plurality of intermediate ordered items being carried by said food material conveyor from said first automatic fixing section to said manual fixing section, thereby causing said plurality of intermediate ordered items to accumulate in said manual fixing section;
   a second input system;
   said second input system sending an information command based on an operator input to said means for controlling;
   said means for controlling sending a command to a plurality of food adding means of said second automatic fixing section, wherein said command instructs said plurality of food adding means to add at least one food material according to an information command sent from said second input system; and
   said second input system sending a release command to said means for stopping so that said plurality of intermediate ordered items which have been through said manual fixing section may be conveyed further to said second automatic fixing section.

2. A hamburger fixing apparatus as recited in claim 1, wherein:
   said means for displaying is located at a position visible by said operator working near said manual fixing section; and
   said second input system has a means for interfacing board located at a position operable by said operator standing near said manual fixing section.

3. A hamburger fixing apparatus as recited in claim 1, wherein:
   said first automatic fixing section has a plurality of automatic fixing mechanisms which include, in order from an upstream end to a downstream end of said first automatic fixing section, an automatic toasted heel feeding machine, an automatic feeding machine for various seasonings, and an automatic grilled patty feeding machine; and
   said second automatic fixing section has a plurality of automatic fixing mechanisms which include, in order from an upstream end to a downstream end of said second automatic fixing section, an automatic grilled patty feeding machine, an automatic feeding machine of various seasonings, and an automatic toasted crown feeding machine; and
   said at least one food material to be added in said manual fixing section is at least one of vegetables, cheese, various fries, and various liquid and kneaded seasonings.

4. A hamburger fixing apparatus as recited in claim 2, wherein:
   said first automatic fixing section has a plurality of automatic fixing mechanisms which include, in order from an upstream end to a downstream end of said first automatic fixing section, an automatic toasted heel feeding machine, an automatic feeding machine for various seasonings, and an automatic grilled patty feeding machine; and
   said second automatic fixing section has a plurality of automatic fixing mechanisms which include, in order from an upstream end to a downstream end of said second automatic fixing section, an automatic grilled patty feeding machine, an automatic feeding machine of various seasonings, and an automatic toasted crown feeding machine; and
   said at least one food material to be added in said manual fixing section is at least one of vegetables, cheese, various fries, and various liquid and kneaded seasonings.

5. A hamburger fixing apparatus, comprising:

means for conveying food material from an upstream starting end region to a downstream finishing end region;

a first automatic fixing section located at said upstream starting end region;

a second automatic fixing section located at said downstream finishing end region;

a manual fixing section located between said upstream starting end region and said downstream finishing end region, first means for inputting an order for an item;

said first inputting means having a means for displaying a plurality of ordered items input into said first inputting means;

means for controlling said first automatic fixing section and said second automatic fixing section;

said means for controlling sending commands to a plurality of food adding means of said first automatic fixing section for making said plurality of ordered items based on an information command sent from said first means for inputting;

second means for inputting an operator command, said operator command sent to said means for controlling;

means for stopping and accumulating a plurality of intermediate ordered items being carried by said conveyor means from said first automatic fixing section to said manual fixing section;

said second means for inputting sending a release command to said means for stopping and accumulating so that said plurality of intermediate ordered items which have been through said manual fixing section may be conveyed further to said second automatic fixing section; and said means for controlling sending a command to a plurality of food adding means of said second automatic fixing section, wherein said command instructs said plurality of food adding means to add at least one food material according to said operator command.

* * * * *